(12) United States Patent
Marlin et al.

(10) Patent No.: US 8,029,630 B2
(45) Date of Patent: Oct. 4, 2011

(54) PYROTECHNIC COMPOSITION THAT CAN BE METERED OUT FOR USE AS A THERMAL FUSE IN A GAS GENERATOR AND A GAS GENERATOR INCLUDING A COMPOUND HAVING SAID COMPOSITION

(75) Inventors: Frederic Marlin, Saint Medard En Jalles (FR); Gerard Marino, Saint Medard En Jalles (FR)

(73) Assignee: SME, Paris (FR)

( * ) Notice: Subject to any disclaimer, the term of this patent is extended or adjusted under 35 U.S.C. 154(b) by 1317 days.

(21) Appl. No.: 11/579,965

(22) PCT Filed: May 11, 2005

(86) PCT No.: PCT/FR2005/001175
§ 371 (c)(1),
(2), (4) Date: Nov. 9, 2006

(87) PCT Pub. No.: WO2005/115948
PCT Pub. Date: Dec. 8, 2005

(65) Prior Publication Data
US 2007/0227635 A1    Oct. 4, 2007

(30) Foreign Application Priority Data

May 13, 2004   (FR) ..................... 04 05171

(51) Int. Cl.
C06B 45/10 (2006.01)
C06B 29/02 (2006.01)
C06B 45/12 (2006.01)

(52) U.S. Cl. ......... 149/19.1; 149/19.9; 149/77; 102/288

(58) Field of Classification Search ................. 149/19.1, 149/19.9, 77
See application file for complete search history.

(56) References Cited

U.S. PATENT DOCUMENTS

| | | | |
|---|---|---|---|
| 3,577,289 A | 5/1971 | Morrell | |
| 3,879,504 A | 4/1975 | Sherman et al. | |
| 4,558,832 A | 12/1985 | Nilsson | |
| 4,597,546 A | 7/1986 | Yamamoto et al. | |
| 5,035,757 A | 7/1991 | Poole | |
| 5,451,008 A | 9/1995 | Hamaue | |
| 5,531,941 A | 7/1996 | Poole | |
| 5,553,803 A | 9/1996 | Mitzkus et al. | |
| 5,567,905 A | 10/1996 | Barnes et al. | |
| 5,589,662 A | 12/1996 | Schleicher et al. | |
| 5,610,444 A | 3/1997 | Austruy et al. | |
| 5,667,161 A | 9/1997 | Mitzkus et al. | |
| 5,700,532 A | 12/1997 | Chiou | |
| 5,743,480 A | 4/1998 | Kopetzky et al. | |
| 5,756,929 A | 5/1998 | Lundstrom et al. | |
| 5,806,888 A | 9/1998 | Adamini | |
| 5,834,679 A * | 11/1998 | Seeger | 102/288 |
| 5,872,329 A | 2/1999 | Burns et al. | |
| 6,007,647 A | 12/1999 | Burns et al. | |
| 6,074,502 A | 6/2000 | Burns et al. | |
| 6,132,537 A | 10/2000 | Zeuner et al. | |
| 6,210,505 B1 | 4/2001 | Khandhadia et al. | |
| 6,287,400 B1 | 9/2001 | Burns et al. | |
| 6,419,177 B2 | 7/2002 | Stevens | |
| 6,422,601 B1 | 7/2002 | Quioc | |
| 6,435,552 B1 | 8/2002 | Lundstrom et al. | |
| 6,505,790 B2 | 1/2003 | Stevens | |
| 6,659,500 B2 | 12/2003 | Whang et al. | |
| 6,749,702 B1 * | 6/2004 | Knowlton et al. | 149/38 |
| 6,752,421 B2 | 6/2004 | Khandhadia et al. | |
| 6,764,096 B2 | 7/2004 | Quioc | |
| 6,846,373 B2 * | 1/2005 | Takayama et al. | 149/46 |
| 2003/0097953 A1 | 5/2003 | Serizawa et al. | |
| 2005/0161135 A1 | 7/2005 | Williams et al. | |
| 2007/0034307 A1 | 2/2007 | Hordos | |
| 2007/0246138 A1 | 10/2007 | Hordos et al. | |

FOREIGN PATENT DOCUMENTS

| | | |
|---|---|---|
| DE | 100 60 320 | 6/2001 |
| EP | 0 665 138 | 8/1995 |
| FR | 2 266 674 | 10/1975 |
| WO | WO 98/18661 | 5/1998 |

OTHER PUBLICATIONS

An International Search Report for International Application No. PCT/FR2005/001175 dated Dec. 20, 2005.

* cited by examiner

*Primary Examiner* — Aileen B Felton
(74) *Attorney, Agent, or Firm* — Hamre, Schumann, Mueller & Larson, P.C.

(57) ABSTRACT

The present invention concerns a composition for a pyrotechnic compound that can be used as a thermal fuse in a gas generator comprising a pyrotechnic charge, said pyrotechnic compound having a self-ignition temperature that is lower than that of the pyrotechnic charge of the generator so as to be capable of initiating combustion of the pyrotechnic charge in the event of abnormal heating of the generator before said pyrotechnic charge reaches its self-ignition temperature. This composition is characterized in that it can be metered out and deposited in the form of an adhesive onto any appropriate support of the generator.

23 Claims, No Drawings

PYROTECHNIC COMPOSITION THAT CAN BE METERED OUT FOR USE AS A THERMAL FUSE IN A GAS GENERATOR AND A GAS GENERATOR INCLUDING A COMPOUND HAVING SAID COMPOSITION

The present invention relates to the pyrotechnic generation of gas. More particularly, it relates to self-igniting compositions serving to trigger a gas generator for preventative purposes when it is subjected to an abnormally high temperature.

By initiating a pyrotechnic gas-generating charge termed the principal charge, a gas generator can generate a quantity of gas over a very short period of time to inflate a protective bag, for example. During a sharp rise in temperature caused by a fire, for example, the pyrotechnic charge of the generator will not burn normally and may react violently or even explode, exposing persons nearby to grave danger. To prevent such accidental and uncontrolled initiation of the gas generator caused by abnormal heating, a pyrotechnic composition acting as a thermal fuse triggers the principal gas generator charge before that charge reaches its self-ignition temperature. In order for such a composition to fully fulfill its function as a thermal fuse, a number of criteria must be satisfied. In general, these criteria are as follows:

the composition acting as a thermal fuse must have a self-ignition temperature that is significantly lower than that of the gas generator composition;

the composition must be reproducibly disposed in a preferred thermal transfer zone so that self-ignition takes place in a reproducible manner before the gas generator composition functions;

for a low mass (generally less than 200 mg [milligrams]), the composition must have a high enthalpy of reaction, sufficient to allow its initiation while limiting its impact on the normal function of the generator.

In addition to those characteristics, the composition must be capable of passing all of the mechanical and thermal qualification tests for the generator and must perturb the normal function of the generator as little as possible, for example as regards ballistics or the toxicity of the gas that is generated.

The majority of formulations used as thermal fuse satisfy the first and third criteria presented above. This is true of U.S. Pat. No. 6,453,816 which describes a pyrotechnic composition used as a thermal fuse comprising a compound such as a metal oxide and a compound selected from oxalates, peroxodisulfates, permanganates, nitrates, sulfamates, etc. The composition may comprise an explosive such as oxynitrotriazolone (ONTA) or guanidine nitrate. The composition described in that document may be mixed with the principal pyrotechnic charge of the gas generator, optionally using a binding agent. In that event, the composition may represent 0.1% to 20% and preferably 0.1% to 5% of the total mass of the principal pyrotechnic charge of the gas generator. That patent also envisages that the composition used as a thermal fuse may be separate from the principal pyrotechnic charge. In that event, the composition must be disposed in a zone that is particularly thermally exposed in order to be capable of being triggered prior to the principal pyrotechnic charge in the event of abnormal heating of the gas generator. The composition may then take the form of pellets.

The above-mentioned patent emphasizes that the composition, for example in the form of pellets, must be placed in a thermally exposed zone. However, it does not mention any means for integrating the pellets. This is important since it may have a substantial influence on the function of the gas generator as regards self-ignition, and on its cost. With a composition in the form of pellets, it is in fact difficult to obtain reproducibility in the function of the thermal fuse composition.

U.S. Pat. No. 5,834,679 describes formulations used as a thermal fuse:

that can be metered out (measured out) and deposited because an auxiliary substance is used in them: a solvent, which may be aqueous or organic. Said solvent renders positioning possible but makes positioning per se much more difficult (because the solvent must be eliminated: a drying out of the deposited composition has to be carried out). Further, an aqueous solvent can cause problems with corrosion (hence the envisaged use, in that US patent, of a protective layer), while an organic solvent involves handling volatile organic compounds (VOCs), which is difficult;

with a small amount of binder (said binder represents at most 5% by weight of the composition and in such an amount cannot provide adequate binding).

Thus, the aim of the invention is to propose a pyrotechnic composition intended for use as a thermal fuse in a gas generator, that can readily be integrated into said pyrotechnic gas generator and that has entirely reproducible behaviour during the self-ignition function of the gas generator.

This is achieved by a composition for a pyrotechnic compound that can be used as a thermal fuse in a gas generator comprising a pyrotechnic charge, said pyrotechnic compound having a self-ignition temperature that is lower than that of the pyrotechnic charge of the gas generator, so as to be capable of initiating combustion of the pyrotechnic charge in the event of abnormal heating of the generator before said pyrotechnic charge reaches its self-ignition temperature, said composition being characterized in that it includes a binder, said binder being selected from the epoxy family or polybutadiene family, said binder being present in the composition in a predetermined amount so that said composition can be metered out and deposited in the form of an adhesive onto any appropriate support of the generator.

In accordance with the invention, the pyrotechnic composition per se (without addition of solvent) can be metered out and can be deposited like an adhesive, that allows it to be positioned easily in the gas generator without the need for specific integration means.

The composition of the invention may, for example, be deposited, using a dosing device, in the form of an adhesive, in the desired amount and at the desired location in the gas generator thereby ensuring good thermal contact with the support onto which it is deposited. Good thermal contact and the possibility of bonding the composition to a heat conducting metallic part of the generator improves the function of the gas generator as regards self-ignition, compared with generators using existing solutions. The solution of the invention can function properly even in the event of the resulting compound having a high self-ignition temperature, higher than the self-ignition temperatures of pellets or powders.

In accordance with the invention, the composition of the invention is distinguished from conventional formulations used in automotive safety as regards its functional characteristics. The composition of the invention does actually not need to satisfy certain specific criteria regarding automotive safety. Examples of these criteria are the search for a particular combustion rate or the need to obtain low-toxicity gases. The composition of the invention merely needs to:

resist thermal and mechanical stresses exerted on the gas generator;

be compatible with the gas-generating pyrotechnic charges present in the gas generator;

have a self-ignition temperature that is as low as possible.

According to the invention, then, a composition is obtained that is completely stable at 110° C. and that reacts rapidly and exothermically above a temperature T of more than 110° C. and as close as possible to 110° C. (between 155° C. and 185° C. for the majority of the test compositions of the invention). The temperature of 110° C. corresponds to a temperature of a stability test routinely carried out for formulations used in automotive safety.

The pyrotechnic composition of the invention is characterized by the nature of the binder that it contains and by the amount of binder therein. Said binder is selected from the family of epoxy compounds or the family of butadienes (cross-linkable binders, thermosetting binders); it is present in an amount such that the composition can be metered out and deposited in the form of an adhesive (without the use of a solvent). It is used in a quantity that ensures it functions as an adhesive.

In the compositions, said binder carries out three functions:
cohesion of charges;
active participation in the pyrotechnic reaction; and
as an adhesive on the support (directly on the support. A priori, there is no need to provide a protective and/or gripping layer).

To this end, said binder is generally present in an amount of at least 15% by weight of the total composition weight.

It is advantageously present in an amount of less than 30% by weight, more advantageously present in an amount of less than 25% by weight of the total composition weight. In any event, it is used in a reasonable amount that is compatible with the combustion characteristics desired for said composition.

The amount of binder varies depending on the exact nature of the binder. The principal criteria for selecting a binder are the mixture feasibility for the intended amount of charge, compatibility with the charges at a temperature of 110° C. and obtaining brisk combustion for a low mass, allowing initiation of the gas generator composition.

After being deposited on its support, the composition hardens by cross-linking.

In accordance with the invention, the binder acts as a deposition vector and participates in combustion of the composition as a reducer. However, it has no influence as regards reaching a low self-ignition temperature. The low self-ignition temperature is obtained because of the charges that are introduced into the binder.

In a first implementation of the invention, the composition comprises an oxidizer/reducer mixture. Such an oxidizer/reducer mixture must allow the correct self-ignition temperature to be obtained.

In a preferred variation of this first implementation, the binder is an epoxy binder, the selected oxidizer is an alkali metal chlorate and the reducer is a sugar. In this variation, the sufficient self-ignition temperature is obtained by the combination of the alkali metal chlorate and the sugar.

In accordance with a feature of this variation the binder, for example an epoxy resin, is present in a percentage by weight in the range 18% to 22% of the total composition weight.

In accordance with a further feature, the alkali metal chlorate is sodium or potassium chlorate and it is present in a percentage by weight in the range 30% to 50% of the total composition weight.

In accordance with a further feature, the sugar is present in a percentage in the range 15% to 25% by weight of the total composition weight.

In accordance with a further feature of this variation, the composition comprises aluminum and an alkali metal perchlorate to improve combustion and enhance the calorimetric potential.

In accordance with a further feature, the aluminum is present in a percentage by weight in the range 5% to 15% of the total composition weight.

In accordance with a further feature, the alkali metal perchlorate is potassium perchlorate, said compound being present in a proportion of less than 20% of the total composition weight.

In accordance with a second implementation, the composition comprises an oxidizing compound and a decomposition catalyst for said oxidizing compound.

In accordance with a feature of said second implementation, the binder is an epoxy resin, the oxidizer is ammonium perchlorate and the decomposition catalyst is a ferrocene compound.

In accordance with a further feature, the epoxy resin is present in a percentage by weight in the range 15% to 30%, advantageously in the range 16% to 25% of the total composition weight.

In accordance with a still further feature, the ammonium perchlorate is present in a percentage by weight in the range 60% to 88%, advantageously in the range 68% to 88% of the total composition weight.

The invention also proposes a gas generator in which a compound acting as a thermal fuse can readily be integrated into a zone that is particularly thermally exposed.

This aim is achieved by a pyrotechnic gas generator comprising a principal pyrotechnic gas-generating charge that can, for example, inflate a protective bag, said generator being characterized in that it comprises a self-igniting pyrotechnic compound having a composition as defined in one of the above implementations, and that has a self-ignition temperature that is lower than that of the principal pyrotechnic charge.

The invention is illustrated in the following examples:

EXAMPLE 1

| Starting materials | % in composition |
|---|---|
| Epoxy binder | 15 to 30 |
| Ferrocene type decomposition catalyst | 2 to 5 |
| Aluminum | 0 to 4 |
| Iron oxide | 0 to 2 |
| Ammonium perchlorate | 60 to 88 |

The mixture of ammonium perchlorate with different grain sizes and the amount of binder allows the rheology of the paste obtained during mixing of the starting materials to be adapted to the deposition needs and to the need for storing the composition throughout its service life.

The mean principal characteristics as regards the thermal fuse aspect of the formulations of Example 1 are as follows:
self-ignition temperature on progressive heating at a rate of 5° C./min [degrees Celsius per minute] in the range 180° C. to 190° C.;
DSC decomposition peak, 5° C./min, peak onset at about 180° C.;
thermal stability acquired during vacuum stability test at 110° C.;
function preserved after 400 h [hours] at 107° C.

In Example 1, the self-ignition temperature was obtained by reducing the ammonium perchlorate decomposition temperature using decomposition catalysts. The epoxy binder acted as a reducer during combustion.

EXAMPLE 2

| Starting materials | % in composition |
|---|---|
| Epoxy binder | 18 to 22 |
| Sodium chlorate | 30 to 50 |
| Potassium perchlorate | 0 to 20 |
| Sugar | 15 to 25 |
| Aluminum | 5 to 15 |

The mean characteristics as regards the thermal fuse aspect of the formulations of Example 2 are as follows:
   self-ignition temperature on progressive heating at a rate of 5° C./min in the range 178° C. to 185° C.;
   DSC decomposition peak, 5° C./min, peak onset at about 180° C.;
   thermal stability acquired during vacuum stability test at 110° C.;
   function preserved after 400 h at 107° C.

In Example 2, the self-ignition temperature is obtained using the couple chlorate/sugar which in the absence of binder could produce self-ignition at about 160° C. The sodium chlorate could be replaced by potassium chlorate.

Coating the chlorate with a binder could produce a composition that is compatible with oxidizers based on ammonium ions (such as ammonium perchlorate).

The DSC (differential scanning calorimetry) test used in Examples 1 and 2 above is a thermal analysis method that can measure the heat released or absorbed by a substance as a function of a programmed temperature rise (in Examples 1 and 2, a rise of 5° C./minute). This method can, for example, measure specific heat, reaction enthalpy, or phase change energy.

The invention claimed is:

1. A pyrotechnic composition that can be used as a thermal fuse in a gas generator, the gas generator comprising a pyrotechnic charge, said pyrotechnic composition having a self-ignition temperature that is lower than a self-ignition temperature of the pyrotechnic charge of the generator so as to be capable of initiating combustion of the pyrotechnic charge in the event of abnormal heating of the generator before said pyrotechnic charge reaches the self-ignition temperature of said pyrotechnic charge, said composition comprising a binder, said binder being selected from the epoxy family of compounds or the polybutadiene family of compounds, said binder being present in the composition in an amount of at least 15% by weight based on the total weight of the composition,
   wherein the composition does not include a solvent, and
   wherein the composition is configured such that the composition can be metered out and deposited in the form of an adhesive onto a support of the generator without an addition of a solvent.

2. The composition according to claim 1, wherein the binder is present in the composition in an amount of less than 30% of the total composition weight.

3. The composition according to claim 1, further comprising an oxidizer/reducer mixture.

4. The composition according to claim 3, wherein the binder is an epoxy type binder, in that the oxidizer is an alkali metal chlorate and in that the reducer is sugar.

5. The composition according to claim 4, wherein the epoxy type binder is present in the composition in an amount of 18% to 22% of the total composition weight.

6. The composition according to claim 4, wherein the alkali metal chlorate is sodium or potassium chlorate and is present in the composition in an amount of 30% to 50% of the total composition weight.

7. The composition according to claim 4, wherein the sugar is present in the composition in an amount of 15% to 25% of the total composition weight.

8. The composition according to claim 4, which comprises aluminum and an alkali metal perchlorate.

9. The composition according to claim 8, wherein the aluminum is present in the composition in an amount of 5% to 15% of the total composition weight.

10. The composition according to claim 8, wherein the alkali metal perchlorate is potassium perchlorate and is present in the composition in an amount of less than 20% of the total composition weight.

11. The composition according to claim 1, further comprising an oxidizing compound and a decomposition catalyst for said oxidizing compound.

12. The composition according to claim 11, wherein the binder is an epoxy type binder, the oxidizer is ammonium perchlorate and the decomposition catalyst is a ferrocene compound.

13. The composition according to claim 12, wherein the binder is present in the composition in an amount of less than 30% of the total composition weight.

14. The composition according to claim 12, wherein the ammonium perchlorate is present in the composition in an amount of 60% to 88% of the total composition weight.

15. A pyrotechnic gas generator comprising:
   a gas-generating pyrotechnic charge, and
   a composition in accordance with claim 1,
   wherein the self-ignition temperature of the composition is lower than a self-ignition temperature of said gas-generating pyrotechnic charge.

16. The composition according to claim 2, further comprising an oxidizer/reducer mixture.

17. The composition according to claim 5, wherein the alkali metal chlorate is sodium or potassium chlorate and is present in the composition in an amount of 30% to 50% of the total composition weight.

18. The composition according to claim 9, wherein the alkali metal perchlorate is potassium perchlorate and is present in the composition in an amount of less than 20% of the total composition weight.

19. The composition according to claim 2, further comprising an oxidizing compound and a decomposition catalyst for said oxidizing compound.

20. The composition according to claim 13, wherein the ammonium perchlorate is present in the composition in an amount of 60% to 88% of the total composition weight.

21. The composition according to claim 1, wherein the self-ignition temperature of the composition is about 155° C. to about 185° C.

22. A method of producing a pyrotechnic gas generator that contains a gas-generating pyrotechnic charge, comprising:
   depositing a pyrotechnic composition onto a support of the pyrotechnic gas generator using a dosing device,
   wherein the pyrotechnic composition comprises a binder that is selected from the epoxy family of compounds or the polybutadiene family of compounds, the binder being present in the pyrotechnic composition in an amount of at least 15% by weight based on the total weight of the pyrotechnic composition, wherein the pyrotechnic composition has a self-ignition temperature that is lower than the self-ignition temperature of the gas-generating pyrotechnic charge, and
wherein the pyrotechnic composition does not include a solvent and is configured such that the pyrotechnic composition can be metered out and deposited in the form of an adhesive onto the support of the generator without an addition of a solvent.

23. A thermal fuse, comprising the composition of claim 1.

* * * * *